(12) United States Patent
Matsuo et al.

(10) Patent No.: US 7,164,835 B2
(45) Date of Patent: Jan. 16, 2007

(54) OPTICAL FIBER

(75) Inventors: Shoichiro Matsuo, Sakura (JP);
Kuniharu Himeno, Sakura (JP);
Koichi Harada, Sakura (JP); Masataka Ikeda, Sakura (JP)

(73) Assignee: Fujikura, Ltd., Tokyo (JP)

( * ) Notice: Subject to any disclaimer, the term of this patent is extended or adjusted under 35 U.S.C. 154(b) by 0 days.

(21) Appl. No.: 11/244,195

(22) Filed: Oct. 6, 2005

(65) Prior Publication Data

US 2006/0039665 A1    Feb. 23, 2006

(51) Int. Cl.
*G02B 6/036* (2006.01)
(52) U.S. Cl. .................. 385/127; 385/123; 385/126
(58) Field of Classification Search ......... 385/123–128
See application file for complete search history.

(56) References Cited

U.S. PATENT DOCUMENTS

| 6,266,467 B1 | 7/2001 | Kato et al. | |
| 6,859,595 B1 * | 2/2005 | Kato et al. | 385/123 |

FOREIGN PATENT DOCUMENTS

| EP | 1116972 A1 | 7/2001 |
| JP | 2618400 B2 | 3/1997 |
| JP | 9-159856 A | 6/1997 |
| JP | 2001-100056 A | 4/2001 |
| JP | 2002-258092 A | 9/2002 |
| WO | WO 2000/031573 A1 | 6/2000 |

* cited by examiner

*Primary Examiner*—Kevin S. Wood
(74) *Attorney, Agent, or Firm*—Sughrue Mion, PLLC (57) ABSTRACT

An optical fiber includes: a core at a center; a first cladding layer; a second cladding layer; and a third cladding layer. A maximum refractive index of the core is greater than any of maximum refractive indices of the first cladding layer, the second cladding layer, and the third cladding layer, and the maximum refractive index of the second cladding layer is smaller than any of the maximum refractive indices of the first and the third cladding layer. Additionally, a ratio of $a_2/a_1$ is not less than about 2.5 and not more than about 4.5, where a1 represents the radius of the core, and a2 represents the radius of an outer periphery of the first cladding layer, and a relative refractive index difference of the core with respect to a maximum refractive index of the third cladding layer is not less than 0.20% and not more than 0.70%.

20 Claims, 4 Drawing Sheets

OPTICAL FIBER

CROSS REFERENCE TO RELATED APPLICATIONS

This application claims priority from PCT Application No. PCT/JP2004/005195, from Japanese Patent Application No. 2003-107760, filed Apr. 11, 2003, from Japanese Patent Application No. 2003-199270, filed Jul. 18, 2003, and from Japanese Patent Application No. 2004-18514, filed Jan. 27, 2004, the contents of which are incorporated herein by reference.

BACKGROUND OF THE INVENTION

Japanese Patent No. 2618400 describes an optical fiber that includes a cladding layer provided on the periphery of a center core in which the cladding layer has a refractive index groove that has a lower refractive index. It is suggested that optical fibers having such a structure are expected to exhibit various advantageous effects, such as reducing the dispersion slope and lowering the bending loss. However, to achieve such effects, it is desirable that the value of $a_2/a_1$ be between 1.5 and 3.5, where $a_1$ is the radius of the core and $a_2$ is the radius of the inner periphery of the refractive index groove.

Conventionally, transmission systems using WDM (wavelength division multiplexing) and optical fibers therefore have actively been developed in order to increase the transmission capacity of trunk lines or long-distance lines. Optical fibers for WDM transmission are required to have certain characteristics, such as reducing nonlinear effects and suppressing the dispersion. In recent years, optical fibers that exhibit a reduced dispersion slope for a system called "metro" in a span of several hundred kilometers and optical fibers that are almost free from loss due to OH have been proposed.

When installment of optical fibers into offices and homes (FTTH; Fiber to the Home) is taken into consideration, characteristics different from those of optical fibers used in transmission are required. That is, when installing optical fibers into buildings or houses, a very small amount of bending of a bending diameter of 30 mm φ or 20 mm φ may be generated. In addition, it is crucial that loss is not increased when a fiber is wound with a small bending diameter to accommodate an excess length. In other words, resistance to a small bending is a crucial characteristic for optical fibers for the FTTH. In addition, good connectivity with optical fibers laid between a base station and buildings or houses (many of which are conventional single-mode fibers for the 1.3 μm band) is also important. Furthermore, low cost is required for such an application.

As optical fibers installed in offices and homes, conventional single-mode fibers for the 1.3 μm band or multimode fibers have been widely used.

However, the allowable smallest bending diameter of such optical fibers is generally about 60 mm φ, and careful attention should be paid to ensure that no bending with a diameter greater than this allowable range is generated when installing the fibers.

Recently, optical fibers having an allowable bending diameter as small as 30 mm φ have been developed by reducing an MFD (mode field diameter) within the range compliant with ITU-T (International Telecommunication Union—Telecom Standardization) G.652, which is an international standard for single-mode fibers (hereinafter, abbreviated as SMFs as appropriate) for the 1.3 μm band.

However, it is desirable for optical fibers that are installed in buildings or houses to have a smaller bending diameter. Although there have been reports about optical fibers with smaller bending diameters, such optical fibers have problems, such as having increased splice loss compared with conventional optical fiber and increased manufacturing costs.

In addition, the Institute of Electronics, Information and Communication Engineers Technical Report OFT 2002-81 reports studies on the possibilities of using photonic crystal fibers in houses or buildings. Photonic crystal fibers are optical fibers having a structure in which holes are provided in the vicinity of the center of optical fibers. Although it is expected that photonic crystal fibers may exhibit characteristics that conventional optical fibers do not have, they are inferior in terms of ease of manufacturing.

In addition, it is desirable that conventional optical fibers used for cables have high bending resistance. For example, for cable layout for connecting cables within a closure, using optical fibers exhibiting resistance to smaller bendings, it is possible to enhance the efficiency of connection and accommodation as well as achieving a reduction in the size of the closure. In addition, the installation task may be performed while communication is taking place through fibers other than the fiber to be installed are active for communication. Even in such a situation, it is possible to perform the task without affecting lines used for communication (live lines) due to unintentional contact.

BRIEF SUMMARY OF THE INVENTION

It is an aspect of the present invention to provide an optical fiber that exhibits a low loss due to bending and good connectivity with a common transmission optical fiber, and can be manufactured at a lower cost.

One exemplary embodiment of the present invention provides an optical fiber comprising: a core provided at a center; a first cladding layer provided on a periphery of the core; a second cladding layer provided on a periphery of the first cladding layer; and a third cladding layer provided on a periphery of the second cladding layer, wherein a maximum refractive index of the core is greater than any of maximum refractive indices of the first cladding layer, the second cladding layer, and the third cladding layer, and the maximum refractive index of the second cladding layer is smaller than any of the maximum refractive indices of the first cladding layer and the third cladding layer, a value of $a_2/a_1$ is not less than 2.5 and not more than 4.5 when a radius of the core is $a_1$ and a radius of an outer periphery of the first cladding layer is $a_2$, and a relative refractive index difference of the core with respect to a refractive index of the third cladding layer is not less than 0.20 and not more than 0.70%.

BRIEF DESCRIPTION OF THE DRAWINGS

The aspects of the present invention will become more apparent by describing in detail illustrative, non-limiting embodiments thereof with reference to the accompanying drawings, in which.

DETAILED DESCRIPTION OF EXEMPLARY EMBODIMENTS OF THE INVENTION

Hereinafter, exemplary embodiments of the invention will be described with reference to the drawings. However, it should not be construed that the present invention is limited to these embodiments; rather, components of these embodiments may be combined if necessary.

Figure 1:
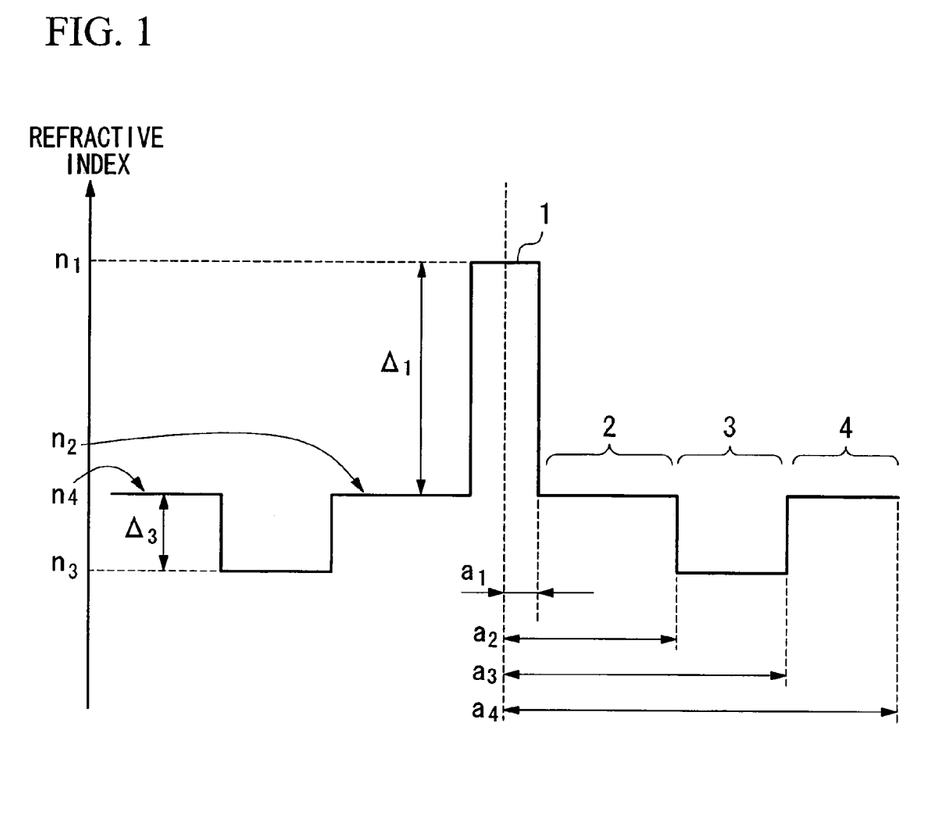
FIG. 1 is a graph showing a refractive index profile of an optical fiber according to an exemplary embodiment of the present invention.

FIG. 1 illustrates a refractive index profile of an embodiment of an optical fiber according to the present invention.

At the center of the optical fiber according to this embodiment, a core 1 having a radius of $a_1$ and a maximum refractive index of $n_1$ is provided. On the periphery of the core 1, a first cladding layer 2 having an outer periphery radius of $a_2$ and a maximum refractive index of $n_2$ is provided, and on the periphery of the first cladding layer 2, a second cladding layer 3 having an outer periphery radius of $a_3$ and a maximum refractive index of $n_3$ is provided. On the periphery of the second cladding layer 3, a third cladding layer 4 is provided, which is the outermost layer of the optical fiber and has an outer periphery radius of $a_4$ and a maximum refractive index of $n_4$.

As used in this specification, the term "maximum refractive index" means the largest refractive index between $a_{n-1}$ and $a_n$ where $a_n$ is an outer periphery radius of a layer and $a_{n-1}$ is an outer periphery radius of the next layer on the inner side. In this example, "n" is an integer of one or greater, and $a_0$ is 0 (μm). In a step-shaped refractive index profile as shown in FIG. 1, the refractive index remains constant between $a_{n-1}$ and $a_n$, and the refractive index is the maximum refractive index. However, as shown in FIGS. 4 to 7, which will be described later, when each of the layers has a refractive index profile, the maximum refractive index as defined in the above is used.

The optical fiber according to the present invention is designed so that the maximum refractive index $n_1$ of the core 1 is greater than any one of the maximum refractive indices $n_2$, $n_3$, and $n_4$ of the first, second, and third cladding layers 2, 3, and 4, respectively, and the maximum refractive index $n_3$ of the second cladding layer 3 is smaller than any one of the maximum refractive indices $n_2$ and $n_4$ of the first and third cladding layers 2 and 4, respectively.

The refractive index profile of the optical fiber can be formed by doping with dopants, such as germanium, fluorine, or the like. In processes used for manufacturing optical fibers, such as VAD (Vapor-phase Axial Deposition) or CVD (Chemical Vapor Deposition), the refractive index profiles of boundaries between each layer may become blurry due to diffusion of the dopants.

In the optical fiber shown in FIG. 1, the refractive index in the first cladding layer 2 is approximately constant in the direction of the radius, defining a refractive index profile of a nearly perfect step-shaped profile. The refractive index profile of the optical fiber according to the present invention does not necessarily have a perfect step-shaped profile. Even if the refractive index is not a step-shaped profile, it is possible to obtain advantageous effects of the present invention by setting the radius of each of the layers defined by the following formula:

Firstly, the radius $a_1$ of the core 1 is defined as the distance between the position in which the relative refractive index difference is one tenth of the maximum relative refractive index difference $\Delta_1$ within the core 1 and the center. In addition, the outer periphery radii $a_2$ and $a_3$ of the first cladding layer 2 and the second cladding layer 3, respectively, are a respective distance between the portion in which $\Delta(r)/dr$ ("r" represents the radius), the derivative value of the radial profile of the relative refractive index difference $\Delta(r)$, reaches the extreme value and the center.

It is possible to calculate an equivalent step-shaped refractive index profile exhibiting equivalent characteristics by using the thus calculated radii (hereinafter, this technique is sometimes referred to as "step conversion" as appropriate). In the present invention, even when the actual refractive index profile does not have a step-shaped profile, provided that a refractive index profile calculated using such a step conversion satisfies given refractive index relationships of the present invention, desired advantageous effects of the present invention can be obtained. In Examples in this specification, the relative refractive index differences of equivalent step-shaped profiles that are obtained by performing a step conversion based on the above-described procedures are also shown.

In this specification, the relative refractive index difference $\Delta_i$ (unit: %) of each of the layers is calculated with respect to the maximum refractive index $n_4$ of the third cladding layer 4 and is expressed by the following Formula (2):

$$\Delta_i = \frac{n_i - n_4}{n_4} \times 100 \qquad (2)$$

(In the formula, "i" is an integer between 1 and 3, and $n_i$ is the maximum refractive index of the each of the layers.)

As shown in FIG. 1, when the core is made up of a single layer, when the relative refractive index difference $\Delta_1$ of the core 1 is increased, it is possible to reduce the bending loss but the MFD tends to be decreased. In addition, when $\Delta_1$ is decreased, a greater MFD can be obtained but the bending loss is increased. The present invention is characterized in that an optical fiber that exhibits excellent bending characteristics can be obtained with an MFD that is comparative to that of a single-peak optical fiber by providing the second cladding layer 3. Although $\Delta_1$ is not limited to a specific value in the present invention, by setting $\Delta_1$ in a range between about 0.20% and about 0.70%, more preferably in a range between about 0.25% and about 0.65%, it is possible to obtain an optical fiber that exhibits good connection characteristic with a conventional SMF and excellent bending characteristics.

In addition, the relative refractive index difference $\Delta_2$ of the first cladding layer 2 is preferably about 0.05% or less, and is more preferably about 0.00% or less. In addition, the relative refractive index difference $\Delta_2$ of the first cladding layer 2 is preferably about −0.10% or higher.

As $\Delta_2$ becomes greater, the cut-off wavelength is increased and a cut-off wavelength of 1260 nm or shorter becomes impossible. In contrast, as the relative refractive index difference $\Delta_2$ of the first cladding layer 2 becomes too small, the containment of the field due to the first cladding layer 2 becomes significant, which is favorable in reducing the bending loss but hinders improvement in the connectivity by enlarging the MFD. For this reason, $\Delta_2$ is preferably designed to achieve a desired cut-off wavelength, a satisfactory bending loss, and a desired MFD at the same time. In general, $\Delta_2$ of about −0.10% or higher can provide desired advantageous effects.

In additiona, the design range of the relative refractive index difference $\Delta$ of the second cladding layer 3 is specified by the refractive index volume V.

$$V = 2\int_{a_2}^{a_3} |\Delta_n(r)| \cdot r dr \quad (1)$$

The outer diameter of the outer periphery of the third cladding layer 4 (twice as large as $a_4$), in other words, the outer diameter of the optical fiber, is generally about 125 µm. In recent years, optical fibers having an outer diameter of about 80 µm have been commercialized for small-sized optical components. Although the optical fiber of the present invention may have an outer diameter in the same range as that of typical optical fibers, the present invention is not limited to the above range.

In addition, although it is possible to control the cut-off wavelength by controlling the radius $a_1$ of the core 1, the bending loss tends to be increased when the cut-off wavelength is reduced in such a manner. Accordingly, the radius $a_1$ of the core 1 is suitably selected according to the required MFD, cut-off wavelength, bending loss, as well as the relative refractive index difference $\Delta_1$ of the core 1.

The ratio of the outer periphery radius of the first cladding layer 2 with respect to the radius of the core 1 ($a_2/a_1$) represents the position of the second cladding layer 3. In the present invention, this value is set to about 2.5 or higher, and preferably to about 3.0 or higher. By providing the second cladding layer 3 at the position in which $a_2/a_1$ falls within the above range, it is possible to improve the bending loss characteristics while reducing the variation in the mode field diameter (referred to as MFD in this specification as appropriate) to a small value, as shown FIGS. 2 to 3, which will be described later.

The effect of reducing the bending loss is expected even when $a_2/a_1$ is increased considerably. However, when $a_2/a_1$ is increased, deterioration of optical characteristics becomes significant, especially a change in the cut-off wavelength due to a change in $\Delta_2$, thereby making the manufacturing thereof difficult. In addition, when $a_2/a_1$ is increased, the advantageous effects achieved by providing the second cladding layer 3 are reduced, which makes a single-mode transmission difficult. For these reasons, it is desireable to keep the ratio $a_2/a_1$ at a value of about 4.5 or less.

The outer periphery radius $a_3$ of the second cladding layer 3, as well as the relative refractive index difference $\Delta$, is specified by the refractive index volume V as described later.

Optical fibers can be utilized for transmission in a broad wavelength band ranging from the 1300 nm band to the 1600 nm band. Optical fibers for the 1300 nm band are stipulated in G.652 by the ITU-T. In general, the lower-limit wavelength of the 1300 nm band is set to 1260 nm, and a cut-off wavelength of 1260 nm or shorter is stipulated by G.652. In order to achieve single-mode transmission in a broad wavelength region ranging from the 1300 nm band to the 1600 nm band, it is desirable that the optical fiber according to the present invention also has a cut-off wavelength of 1260 nm or shorter. There is a tradeoff between the cut-off wavelength and optical characteristics, such as MFD or bending loss, and the refractive index profile is set according to desired characteristics.

In addition, it has been found that the bending loss ratio shows correlations with the value of $a_2/a_1$ and the above-described value of V. More specifically, the bending loss ratio tends to be decreased as V increases, and the relationship between V and the bending loss is determined by the value of $a_2/a_1$, i.e., the position of the low refractive index layer. In the present invention, in order to achieve better bending loss characteristics, the refractive index volume (V) of the second cladding layer expressed by the above Formula (1) is preferably about 25%·µm² or higher, and more preferably about 50%·µm² or higher. In addition, when single-mode transmission at 1260 nm or higher is taken into consideration, the value of V is preferably about 110%·µm² or less.

According to the present invention, provision of the second cladding layer helps to effectively reduce the loss due to bending.

For example, as indicated by Tables 1 to 4, which will be explained later, as for an increase in the bending loss (in this specification, referred to as a "bending loss ratio" as appropriate) when wound ten times around a mandrel having a diameter of 20 mm (20 mm ϕ, hereinafter referred to as 20ϕ as appropriate) (at a measurement wavelength of 1550 nm, and the others are measured in the same condition), when assuming an increase in a bending loss at a wavelength of 1550 nm of a single-peak optical fiber that has a single-peak refractive index profile without a second cladding layer 3 and is configured so that the same cut-off wavelength is obtained to be 1, it is possible to reduce the bending loss ratio to about 0.4 or less, and preferably to about 0.15 or less.

In addition, according to the present invention, it is possible to obtain an optical fiber that exhibits a smaller loss due to bending. More specifically, it is possible to reduce the bending loss ratio, which is the bending loss when wound ten times around a mandrel having a diameter of 15 mm (15 mm ϕ, hereinafter referred to as 15ϕ as appropriate) at a wavelength of 1550 nm to 0.55 or less, and preferably to about 0.25 or less.

According to the optical fiber of the present invention, it is possible to reduce the value of the bending loss at a wavelength of 1550 nm to about 0.05 dB or lower per turn when wound in a bending diameter of 20 mm. Here, the value of the bending loss per turn can be calculated by dividing the value of the bending loss generated when wound ten times around a mandrel having a given diameter, for example, by 10.

Furthermore, it is possible to reduce the value of the bending loss at a wavelength of 1650 nm to about 0.05 dB or lower per turn when wound in a bending diameter of 20 mm.

In addition, according to the present invention, an optical fiber that reduces the loss due to bending to such a low level while having a large mode field diameter can be realized. More specifically, it is possible to obtain an optical fiber having a mode field diameter of about 8.3 µm or more at a wavelength of 1550 nm.

According to the optical fiber of the present invention, it is possible to reduce the value of the bending loss at a wavelength of 1550 nm to about 0.05 dB or lower per turn when wound in a bending diameter of 15 mm.

Furthermore, it is possible to reduce the value of the bending loss at a wavelength of 1650 nm to about 0.05 dB or lower per turn when wound in a bending diameter of 15 mm.

In addition, according to the present invention, an optical fiber that reduces the loss due to bending to such a low level while having a large mode field diameter can be realized. More specifically, it is possible to obtain an optical fiber having a mode field diameter of about 7.8 µm or more at a wavelength of 1550 nm.

In addition, according to the present invention, an optical fiber that reduces the loss due to bending to such a low level while having a large mode field diameter can be realized. More specifically, it is possible to obtain an optical fiber having a mode field diameter of about 7.3 µm or more at a wavelength of 1310 nm.

More specifically, it is possible to obtain an optical fiber having a mode field diameter of about 6.8 µm or more at a wavelength of 1310 nm.

Furthermore, it is possible to reduce the value of the bending loss at a wavelength of 1550 nm to about 0.05 dB or lower per turn when wound in a bending diameter of 10 mm.

According to the optical fiber of the present invention, it is possible to reduce the value of the bending loss at a wavelength of 1650 nm to about 0.05 dB or lower per turn when wound in a bending diameter of 10 mm.

In addition, according to the present invention, an optical fiber that reduces the loss due to bending to such a low level while having a large mode field diameter can be realized. More specifically, it is possible to obtain an optical fiber having a mode field diameter of about 7.3 µm or more at a wavelength of 1550 nm.

Furthermore, more specifically, it is possible to obtain an optical fiber having a mode field diameter of about 6.3 µm or more at a wavelength of 1310 nm.

According to the present invention, it is possible to reduce the bending loss at a wavelength of 1550 nm when wound in a bending diameter of 20 mm to about 1 dB or lower per turn while achieving a mode field diameter of about 7.9 µm or more at a wavelength of 1310 nm.

According to the present invention, it is possible to obtain an optical fiber that exhibits the value of the bending loss at a wavelength of 1550 nm of about 0.5 dB or lower per turn when wound in a bending diameter of 20 mm.

Furthermore, according to the present invention, it is possible to obtain an optical fiber that has a zero dispersion wavelength of not less than about 1300 nm and not more than about 1324 nm.

Here, together with the 1310 nm wavelength band, the 1550 nm wavelength band is a wavelength band that has been widely used, and the characteristic of low bending loss is important in addition to a low transmission loss in these wavelength bands. Especially for applications, such as a user's premises wiring, when a fiber is laid near a wall or is accommodated in a connecter near the wall, minute bending is possibly generated if the fiber is bent or wound at a small radius. For this reason, bending characteristics at a small bending diameter, for example, a bending diameter of 20 mm, or a bending diameter of 15 mm, are important. In addition, since wavelength bands up to 1650 nm are assumed for line monitoring, having a low bending loss also at 1650 nm is an important characteristic.

In addition, the optical fiber according to the present invention that is provided with the second cladding layer 3 is characterized in that the bending loss is significantly reduced compared to a single-peak fiber while limiting reduction in the MFD. More specifically, with the optical fiber according to the present invention, where M1 represents an MFD at a wavelength of 1550 nm of the optical fiber of the present invention, and M2 represents an MFD at a wavelength of 1550 nm of a single-peak optical fiber that has a single-peak refractive index profile without a second cladding layer 3 and is configured so that the same cut-off wavelength is obtained, it is possible to achieve a value of M1/M2 of about 0.98 or higher.

Furthermore, the optical fiber according to the present invention realizes some other features that have not been described above by providing the second cladding layer 3. For example, non-zero dispersion shift fibers (NZ-DSFs) that have been developed for WDM communication require complex core refractive index profiles, whereas the optical fiber according to the present invention is advantageous in that it can be manufactured at relatively low cost since the characteristics thereof can be improved without modification of the refractive index profile of the core.

EXAMPLES

In the following, advantageous effects of the present invention will be explained using specific examples.

It should be noted that the value of cut-off wavelength in the following Test Examples and Examples was measured using the procedure prescribed in ITU-T G.650.—Definitions and test methods for linear, deterministic attributes of single-mode fiber and cable. Unless otherwise explicitly stated, in the following Test Examples and Examples, a cut-off wavelength means a 2-m fiber cut-off length.

Test Example 1

An optical fiber was fabricated by designing it to realize the following parameters:

The relative refractive index difference $\Delta_1$ of the core 1: 0.52%,

The relative refractive index difference $\Delta_2$ of the first cladding layer 2: 0%, The relative refractive index difference $\Delta_3$ of the second cladding layer 3: −0.20%, The ratio of the thickness of the second cladding layer 3 to the radius of the core $(a_3-a_2)/a_1=3.0$, The outer diameter of the optical fiber: 125 µm The cut-off wavelength: 1250 nm.

The change in MFD and the change in the bending loss were studied when the value of $a_2/a_1$ was varied. The measurement wavelength of the MFD and the bending loss were set to 1550 nm.

The bending loss was measured by means of an increase in the loss when an optical fiber of a given length was wound ten times around a mandrel with a diameter of 20 mm. In other words, the bending loss was P1–P2 (dB) when assuming the power of light exiting from the optical fiber before being wound around the mandrel to be P1 (unit: dBm), and the power of the exiting light after being wound to be P2 (unit: dBm). The results are shown in FIG. 2 and FIG. 3.

Figure 2:
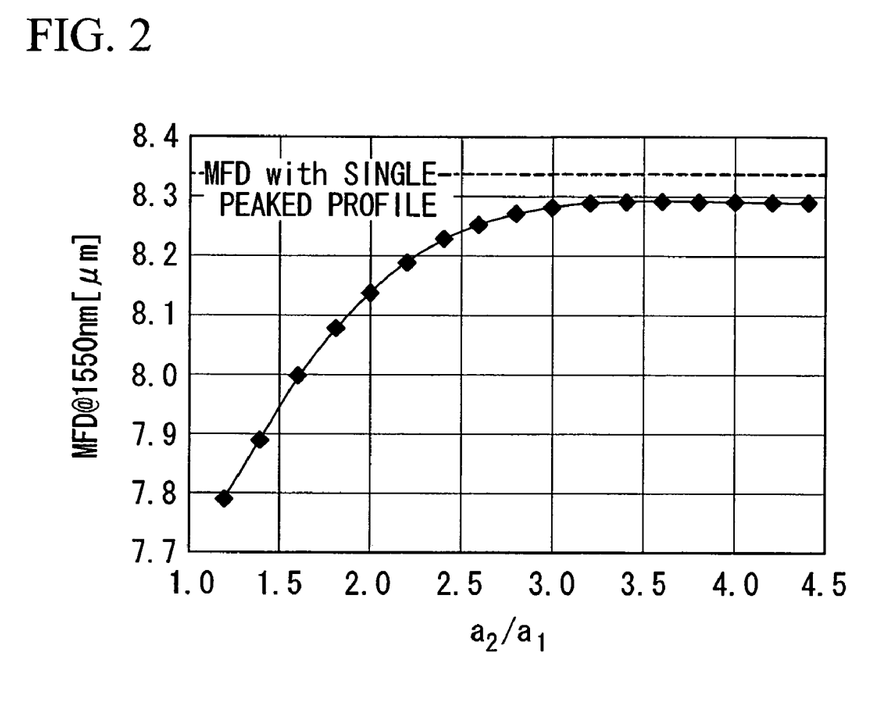
FIG. 2 is a graph showing the relationship between the position of a second cladding layer and MFD in Test Example 1.
Figure 3:
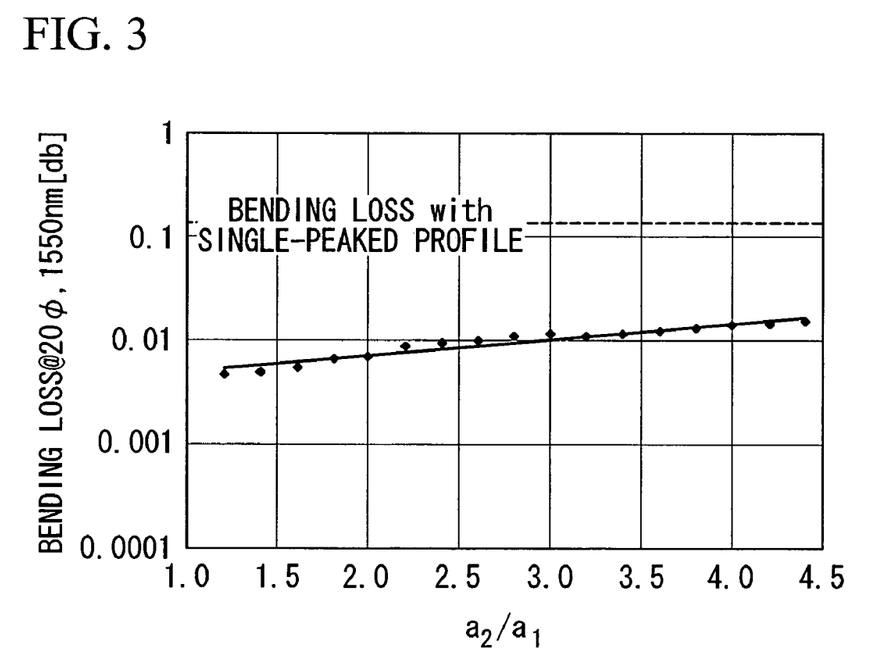
FIG. 3 is a graph showing the relationship between the position of the second cladding layer and bending loss in Test Example 1.

The broken lines in the figures represent the MFD in FIG. 2 and the bending loss of a single-peak optical fiber that has a single-peak refractive index profile without a second cladding layer in FIG. 3 and were configured so that the same cut-off wavelength is obtained.

The results in FIG. 3 indicate that provision of the second cladding layer 3 significantly improved the bending characteristics compared to the single-peak optical fiber. In addition, it can be seen that the bending loss tends to gradually increase as the value of $a_2/a_1$ increases.

In addition, the results in FIG. 2 indicate that the MFD drops more suddenly when the value of $a_2/a_1$ falls within a region smaller than about 3.0. In order to keep the splice loss with an optical fiber having a large MFD, such as the one stipulated by ITU-T G.652, to a low level, suppressing reduction in MFD is necessary. When $a_2/a_1$ is set to 2.5 or higher, an MFD of about 98% or higher of that of a single-peak fiber can be achieved and acceptable connection characteristics can be maintained.

From these results, it is acknowledged that a large MFD and low bending loss can be attained by increasing the value of $a_2/a_1$ by 2.5 times or higher, and preferably about 3.0 times or higher.

Test Example 2

Optical fibers having parameters as shown in the following Table 1 were fabricated, and the cut-off wavelength, the effective area of the core ($A_{eff}$), the MFD, the chromatic dispersion, the dispersion slope, and the zero dispersion wavelength were measured using well-known techniques.

It should be noted that the measurement of the cut-off wavelength was performed by the transmitted power technique that is stipulated in ITU-T G.650.1—Definitions and test methods for linear, deterministic attributes of single-mode fiber and cable, 5.3.1. In general, among transmitted power techniques, a method in which the cut-off wavelength is determined from a power loss when a small-diameter bending is applied to a fiber (bending method) is often used. However, the optical fibers that were prototyped exhibited large bending loss at a higher-order mode, which made precise measurement of cut-off wavelengths with the above-identified bending method difficult. For this reason, a method in which a cut-off wavelength was evaluated by taking the power when transmitting through a multimode fiber as a reference (multimode reference method) was used for the measurements.

In addition, as a bending loss characteristic, bending losses were measured in the same manner as in Test Example 1 described above. The measurement wavelengths used were 1550 nm and 1650 nm. Three mandrel diameters of 20 mm, 15 mm, and 10 mm were used. When the bending loss to be measured was small, after the number of bendings (the number of turns) was increased where appropriate to ensure that an acceptable accuracy of measurement of bending loss was obtained, then the resulting value was converted into a bending loss per 10 turns. It should be noted that in the table, increases in loss per unit length (the amount of increase in the bending loss, unit: dB/m) are also listed. For example, when assuming the bending loss when wound ten times around a mandrel with 20 mm ϕ to be Px (P1–P2 (dB)), an increase in loss Py per unit length is given using the following equation:

$$Px \text{ (unit: dB/m)} = Py/(\pi \times 0.02 \times 10)$$

In addition, the refractive index volume (V) was calculated from the Formula (1) described above.

Sample Nos. 1, 5, 9, 12, 21, 28, 35, and 38 were single-peak optical fibers without a second cladding layer 3.

The bending loss ratios of Sample Nos. 2 to 4 are ratios of the values of the bending losses per ten turns of Sample Nos. 2 to 4 when assuming the bending loss per ten turns of Sample No. 1 to be 1. Similarly, the bending loss ratios of Sample Nos. 6 to 8 are the values when taking that of Sample No. 5 as a reference, the bending loss ratios of Sample Nos. 10 and 11 are the values when taking that of Sample No. 9 as a reference, the bending loss ratios of Sample Nos. 13 to 20 are the values when taking that of Sample No. 12 as a reference, the bending loss ratios of Sample Nos. 22 to 27 are the values when taking that of Sample No. 21 as a reference, the bending loss ratios of Sample Nos. 29 to 34 are the values when taking that of Sample No. 28 as a reference, the bending loss ratios of Nos. 36 to 37 are the values when taking that of Sample No. 35 as a reference, and the bending loss ratios of Sample Nos. 39 and 40 are the values when taking that of Sample No. 38 as a reference.

It should be noted that in Sample Nos. 16, 18, 24 to 27, and 32, the values of V were too high to reduce the cut-off wavelengths to the same level as the reference samples. Therefore, some of the bending loss ratios of such samples are not listed. In addition, in some of the measurement conditions of Sample No. 35 and 38, the bending losses were too large to make an evaluation. For this reason, some of the bending loss ratios of Sample Nos. 36, 37, 39, and 40 are not listed. The measurement results are shown in Tables 2 and 4.

TABLE 1

| Sample No. | Δ1 [%] | Δ2 [%] | Δ3 [%] | a1 [μm] | a2 [μm] | a3 [μm] | a2/a1 | a3/a1 | V [% μm$^2$] | 2a2/MFD at 1550 nm |
|---|---|---|---|---|---|---|---|---|---|---|
| 1 | 0.65 | 0.00 | — | 3.04 | 9.12 | — | 3.0 | — | — | — |
| 2 | 0.65 | 0.00 | −0.30 | 3.01 | 7.83 | 12.05 | 2.6 | 4.0 | 25 | 2.1 |
| 3 | 0.65 | 0.00 | −0.30 | 2.99 | 8.97 | 13.46 | 3.0 | 4.5 | 30 | 2.4 |
| 4 | 0.65 | 0.00 | −0.40 | 2.99 | 8.98 | 13.48 | 3.0 | 4.5 | 40 | 2.4 |
| 5 | 0.60 | 0.00 | — | 3.18 | 9.53 | — | 3.0 | — | — | — |
| 6 | 0.60 | 0.00 | −0.30 | 3.13 | 8.14 | 13.16 | 2.6 | 4.2 | 32 | 2.1 |
| 7 | 0.60 | 0.00 | −0.30 | 3.12 | 9.35 | 14.03 | 3.0 | 4.5 | 33 | 2.4 |
| 8 | 0.60 | 0.00 | −0.40 | 3.12 | 9.35 | 14.03 | 3.0 | 4.5 | 44 | 2.4 |
| 9 | 0.58 | 0.00 | — | 4.85 | 14.55 | — | 3.0 | — | — | — |
| 10 | 0.58 | −0.05 | −0.30 | 3.32 | 9.97 | 14.95 | 3.0 | 4.5 | 37 | 2.6 |
| 11 | 0.58 | −0.10 | −0.30 | 3.44 | 10.31 | 15.47 | 3.0 | 4.5 | 40 | 2.7 |
| 12 | 0.52 | 0.00 | — | 3.43 | 10.30 | — | 3.0 | — | — | — |
| 13 | 0.52 | 0.00 | −0.20 | 3.35 | 10.04 | 15.40 | 3.0 | 4.6 | 27 | 2.4 |
| 14 | 0.52 | 0.00 | −0.20 | 3.31 | 13.23 | 18.53 | 4.0 | 5.6 | 34 | 3.2 |
| 15 | 0.52 | 0.00 | −0.40 | 3.36 | 10.08 | 15.45 | 3.0 | 4.6 | 55 | 2.4 |
| 16 | 0.52 | 0.00 | −0.40 | 3.35 | 10.06 | 20.13 | 3.0 | 6.0 | 122 | 2.4 |
| 17 | 0.52 | 0.00 | −0.40 | 3.31 | 13.25 | 18.55 | 4.0 | 5.6 | 67 | 3.2 |
| 18 | 0.52 | 0.00 | −0.40 | 3.31 | 13.26 | 23.20 | 4.0 | 7.0 | 145 | 3.2 |
| 19 | 0.52 | 0.00 | −0.60 | 3.36 | 10.08 | 13.78 | 3.0 | 4.1 | 53 | 2.4 |

TABLE 1-continued

| Sample No. | Δ1 [%] | Δ2 [%] | Δ3 [%] | a1 [μm] | a2 [μm] | a3 [μm] | a2/a1 | a3/a1 | V [% μm²] | 2a2/MFD at 1550 nm |
|---|---|---|---|---|---|---|---|---|---|---|
| 20 | 0.52 | 0.00 | −0.60 | 3.32 | 13.27 | 16.93 | 4.0 | 5.1 | 66 | 3.2 |
| 21 | 0.45 | 0.00 | — | 3.72 | 11.15 | — | 3.0 | — | — | — |
| 22 | 0.45 | 0.00 | −0.25 | 3.61 | 10.82 | 16.23 | 3.0 | 4.5 | 37 | 2.4 |
| 23 | 0.45 | 0.00 | −0.35 | 3.61 | 10.83 | 16.25 | 3.0 | 4.5 | 51 | 2.4 |
| 24 | 0.45 | 0.00 | −0.40 | 3.61 | 10.84 | 21.68 | 3.0 | 6.0 | 141 | 2.4 |
| 25 | 0.45 | 0.00 | −0.40 | 3.57 | 14.27 | 24.98 | 4.0 | 7.0 | 168 | 3.2 |
| 26 | 0.45 | 0.00 | −0.60 | 3.62 | 10.85 | 19.90 | 3.0 | 5.5 | 167 | 2.4 |
| 27 | 0.45 | 0.00 | −0.60 | 3.57 | 14.28 | 23.20 | 4.0 | 6.5 | 201 | 3.2 |
| 28 | 0.35 | 0.00 | — | 4.28 | 12.84 | — | 3.0 | — | — | — |
| 29 | 0.35 | 0.00 | −0.40 | 4.10 | 12.31 | 16.42 | 3.0 | 4.0 | 47 | 2.4 |
| 30 | 0.35 | 0.00 | −0.40 | 4.15 | 10.79 | 14.94 | 2.6 | 3.6 | 64 | 2.2 |
| 31 | 0.35 | 0.00 | −0.20 | 4.05 | 16.19 | 28.33 | 4.0 | 7.0 | 108 | 3.2 |
| 32 | 0.35 | 0.00 | −0.40 | 4.10 | 12.31 | 24.63 | 3.0 | 6.0 | 182 | 2.4 |
| 33 | 0.35 | 0.00 | −0.25 | 4.14 | 10.35 | 14.49 | 2.50 | 3.50 | 25.71 | 2.06 |
| 34 | 0.35 | 0.00 | −0.25 | 4.10 | 12.29 | 16.38 | 3.00 | 4.00 | 29.35 | 2.44 |
| 35 | 0.32 | 0.00 | — | 4.51 | 13.54 | — | 3.00 | — | — | — |
| 36 | 0.32 | 0.00 | −0.25 | 4.29 | 12.86 | 17.15 | 3.00 | 4.00 | 32.17 | 2.44 |
| 37 | 0.32 | 0.00 | −0.25 | 4.29 | 12.86 | 19.30 | 3.00 | 4.50 | 51.71 | 2.44 |
| 38 | 0.25 | 0.00 | — | 5.21 | 15.63 | — | 3.00 | — | — | — |
| 39 | 0.25 | 0.00 | −0.25 | 4.86 | 14.57 | 19.43 | 3.00 | 4.00 | 41.27 | 2.44 |
| 40 | 0.25 | 0.00 | −0.25 | 4.92 | 12.29 | 17.21 | 2.50 | 3.50 | 36.27 | 2.07 |

MNP = Measurement not possible

TABLE 2

| Sample No. | Cut-off wavelength [μm] | Aeff at 1310 nm [μm²] | MFD at 1310 nm [μm] | Aeff at 1550 nm [μm²] | MFD at 1550 nm [μm] | Zero-dispersion wavelength [nm] | Chromatic Dispersion at 1550 nm [ps/nm/km] | Dispersion slope at 1550 nm [ps/nm²/km] |
|---|---|---|---|---|---|---|---|---|
| 1 | 1.25 | 34.2 | 6.58 | 42.4 | 7.44 | 1359.4 | 11.9 | 0.054 |
| 2 | 1.25 | 33.8 | 6.55 | 41.6 | 7.37 | 1353.7 | 13.2 | 0.059 |
| 3 | 1.25 | 33.7 | 6.54 | 41.8 | 7.39 | 1361.3 | 12.3 | 0.058 |
| 4 | 1.25 | 33.7 | 6.54 | 41.8 | 7.39 | 1360.0 | 12.5 | 0.059 |
| 5 | 1.25 | 37.2 | 6.86 | 46.1 | 7.75 | 1350.6 | 12.8 | 0.055 |
| 6 | 1.25 | 36.7 | 6.82 | 45.2 | 7.68 | 1348.3 | 13.7 | 0.060 |
| 7 | 1.25 | 36.6 | 6.81 | 45.4 | 7.70 | 1353.0 | 13.1 | 0.059 |
| 8 | 1.25 | 36.6 | 6.81 | 45.3 | 7.69 | 1352.2 | 13.2 | 0.059 |
| 9 | 1.25 | 38.5 | 6.98 | 47.7 | 7.89 | 1347.2 | 13.1 | 0.055 |
| 10 | 1.25 | 37.8 | 6.87 | 45.7 | 7.67 | 1332.0 | 14.5 | 0.057 |
| 11 | 1.25 | 32.8 | 6.82 | 44.8 | 7.55 | 1318.6 | 15.6 | 0.056 |
| 12 | 1.25 | 43.2 | 7.39 | 53.4 | 8.34 | 1337.5 | 14.1 | 0.056 |
| 13 | 1.25 | 42.3 | 7.32 | 52.4 | 8.28 | 1341.5 | 14.1 | 0.059 |
| 14 | 1.25 | 41.9 | 7.30 | 52.4 | 8.29 | 1347.0 | 13.3 | 0.057 |
| 15 | 1.25 | 42.4 | 7.33 | 52.4 | 8.27 | 1339.4 | 14.5 | 0.060 |
| 16 | 1.45 | 42.3 | 7.33 | 52.3 | 8.27 | 1339.7 | 14.4 | 0.060 |
| 17 | 1.25 | 41.9 | 7.30 | 52.4 | 8.29 | 1346.6 | 13.4 | 0.057 |
| 18 | 1.55 | 41.9 | 7.31 | 52.5 | 8.29 | 1346.5 | 13.4 | 0.057 |
| 19 | 1.25 | 42.4 | 7.33 | 52.3 | 8.26 | 1338.5 | 14.7 | 0.061 |
| 20 | 1.25 | 42.0 | 7.31 | 52.5 | 8.29 | 1345.9 | 13.5 | 0.058 |
| 21 | 1.25 | 50.3 | 7.97 | 62.0 | 8.98 | 1326.5 | 15.2 | 0.058 |
| 22 | 1.25 | 48.9 | 7.88 | 60.6 | 8.90 | 1330.8 | 15.3 | 0.060 |
| 23 | 1.25 | 49.0 | 7.88 | 60.5 | 8.89 | 1329.9 | 15.4 | 0.061 |
| 24 | 1.51 | 49.0 | 7.88 | 60.6 | 8.89 | 1329.5 | 15.5 | 0.061 |
| 25 | 1.60 | 48.6 | 7.86 | 60.7 | 8.92 | 1335.2 | 14.5 | 0.058 |
| 26 | 1.58 | 49.1 | 7.88 | 60.5 | 8.88 | 1328.6 | 15.7 | 0.062 |
| 27 | 1.62 | 48.6 | 7.86 | 60.7 | 8.92 | 1335.1 | 14.6 | 0.059 |
| 28 | 1.25 | 65.7 | 9.09 | 80.5 | 10.22 | 1311.9 | 16.9 | 0.059 |
| 29 | 1.25 | 63.2 | 8.95 | 78.0 | 10.08 | 1316.1 | 16.9 | 0.062 |
| 30 | 1.26 | 63.5 | 8.95 | 77.2 | 10.00 | 1310.2 | 17.9 | 0.064 |
| 31 | 1.25 | 62.5 | 8.92 | 78.2 | 10.12 | 1320.7 | 16.1 | 0.060 |
| 32 | 1.46 | 63.2 | 8.95 | 78.0 | 10.08 | 1316.0 | 16.9 | 0.063 |
| 33 | 1.25 | 63.43 | 8.95 | 77.43 | 10.03 | 1311.7 | 17.5 | 0.063 |
| 34 | 1.25 | 63.07 | 8.94 | 78.04 | 10.09 | 1317.0 | 16.7 | 0.061 |
| 35 | 1.25 | 72.39 | 9.53 | 88.50 | 10.71 | 1307.6 | 17.4 | 0.060 |
| 36 | 1.25 | 69.07 | 9.36 | 85.41 | 10.56 | 1312.9 | 17.2 | 0.062 |
| 37 | 1.25 | 69.09 | 9.36 | 85.41 | 10.56 | 1312.8 | 17.2 | 0.062 |
| 38 | 1.25 | 94.52 | 10.87 | 114.82 | 12.18 | 1298.4 | 18.5 | 0.061 |
| 39 | 1.25 | 88.57 | 10.60 | 109.38 | 11.94 | 1303.9 | 18.2 | 0.063 |
| 40 | 1.25 | 89.07 | 10.60 | 108.38 | 11.85 | 1300.0 | 18.9 | 0.063 |

TABLE 3

| | Bending loss at 1550 nm | | | | | | | | |
|---|---|---|---|---|---|---|---|---|---|
| | 20 φ | | | 15 φ | | | 10 φ | | |
| Sample No. | [dB/m] | ×10 t [dB] | Bending loss ratio | [dB/m] | ×10 t [dB] | Bending loss ratio | [dB/m] | ×10 t [dB] | Bending loss ratio |
| 1 | 0.002 | 0.001 | — | 0.015 | 0.007 | — | 1.063 | 0.334 | — |
| 2 | 0.000 | <0.001 | — | 0.003 | 0.002 | 0.00 | 0.142 | 0.045 | 0.13 |
| 3 | 0.001 | <0.001 | — | 0.003 | 0.002 | 0.00 | 0.136 | 0.043 | 0.13 |
| 4 | 0.000 | <0.001 | — | 0.002 | 0.001 | 0.00 | 0.067 | 0.021 | 0.06 |
| 5 | 0.009 | 0.006 | — | 0.067 | 0.042 | — | 3.517 | 2.210 | — |
| 6 | 0.002 | 0.001 | 0.00 | 0.011 | 0.005 | 0.12 | 0.302 | 0.142 | 0.06 |
| 7 | 0.002 | 0.002 | 0.00 | 0.012 | 0.006 | 0.14 | 0.349 | 0.164 | 0.07 |
| 8 | 0.001 | <0.001 | 0.00 | 0.007 | 0.003 | 0.08 | 0.167 | 0.079 | 0.04 |
| 9 | 0.017 | 0.011 | — | 0.115 | 0.054 | 1.30 | 5.257 | 2.477 | 1.12 |
| 10 | 0.002 | 0.001 | 0.00 | 0.007 | 0.003 | 0.08 | 0.172 | 0.081 | 0.04 |
| 11 | 0.001 | <0.001 | 0.00 | 0.004 | 0.002 | 0.04 | 0.083 | 0.039 | 0.02 |
| 12 | 0.133 | 0.084 | — | 0.731 | 0.344 | — | 25.75 | 8.090 | — |
| 13 | 0.043 | 0.027 | 0.32 | 0.159 | 0.075 | 0.22 | 3.020 | 0.949 | 0.12 |
| 14 | 0.051 | 0.032 | 0.39 | 0.179 | 0.084 | 0.24 | 3.111 | 0.977 | 0.12 |
| 15 | 0.012 | 0.007 | 0.09 | 0.035 | 0.016 | 0.05 | 0.485 | 0.152 | 0.02 |
| 16 | 0.001 | <0.001 | — | 0.002 | 0.001 | — | 0.013 | 0.004 | — |
| 17 | 0.014 | 0.009 | 0.11 | 0.040 | 0.019 | 0.06 | 0.504 | 0.158 | 0.02 |
| 18 | 0.001 | <0.001 | — | 0.002 | 0.001 | — | 0.016 | 0.005 | — |
| 19 | 0.012 | 0.008 | 0.09 | 0.037 | 0.017 | 0.05 | 0.522 | 0.164 | 0.02 |
| 20 | 0.015 | 0.009 | 0.11 | 0.043 | 0.020 | 0.06 | 0.556 | 0.175 | 0.02 |
| 21 | 0.845 | 0.531 | — | 3.280 | 1.546 | — | 71.12 | 22.34 | — |
| 22 | 0.214 | 0.134 | 0.25 | 0.553 | 0.260 | 0.17 | 6.454 | 2.028 | 0.25 |
| 23 | 0.109 | 0.068 | 0.13 | 0.253 | 0.119 | 0.08 | 2.493 | 0.783 | 0.10 |
| 24 | 0.004 | 0.003 | 0.00 | 0.006 | 0.003 | 0.00 | 0.023 | 0.007 | — |
| 25 | 0.005 | 0.003 | 0.01 | 0.006 | 0.003 | 0.00 | 0.023 | 0.007 | — |
| 26 | 0.002 | 0.001 | 0.00 | 0.002 | 0.001 | 0.00 | 0.007 | 0.002 | — |
| 27 | 0.002 | 0.001 | 0.00 | 0.002 | 0.001 | 0.00 | 0.007 | 0.002 | — |
| 28 | 14.00 | 8.796 | — | 37.98 | 17.90 | — | 516 | 162 | — |
| 29 | 1.854 | 1.165 | 0.13 | 3.036 | 1.431 | 0.08 | 19.12 | 6.007 | 0.04 |
| 30 | 0.637 | 0.400 | 0.05 | 0.911 | 0.429 | 0.02 | 4.592 | 1.443 | 0.01 |
| 31 | 0.367 | 0.231 | 0.03 | 0.426 | 0.201 | 0.01 | 1.546 | 0.486 | 0.06 |
| 32 | 0.015 | 0.010 | 0.00 | 0.011 | 0.005 | 0.01 | 0.019 | 0.006 | — |
| 33 | 4.150 | 2.608 | 0.30 | 8.028 | 3.783 | 0.21 | 66.11 | 20.77 | 0.13 |
| 34 | 4.180 | 2.626 | 0.30 | 7.764 | 3.659 | 0.20 | 59.93 | 18.83 | 0.12 |
| 35 | 30.20 | 18.98 | — | 76.23 | 35.92 | — | MNP | MNP | — |
| 36 | 7.290 | 4.580 | 0.24 | 11.84 | 5.579 | 0.16 | 75.97 | 23.87 | — |
| 37 | 3.220 | 2.023 | 0.11 | 4.548 | 2.143 | 0.06 | 23.33 | 7.330 | — |
| 38 | 160.0 | 100.5 | — | 321.3 | 151.4 | — | MNP | MNP | — |
| 39 | 22.50 | 14.14 | 0.14 | 26.81 | 12.63 | 0.08 | 111.9 | 35.16 | — |
| 40 | 21.60 | 13.57 | 0.14 | 26.37 | 12.43 | 0.08 | 114.0 | 35.80 | — |

TABLE 4

| | Bending loss at 1650 nm | | | | | | | | |
|---|---|---|---|---|---|---|---|---|---|
| | 20 φ | | | 15 φ | | | 10 φ | | |
| Sample No. | [dB/m] | ×10 t [dB] | Bending loss ratio | [dB/m] | ×10 t [dB] | Bending loss ratio | [dB/m] | ×10 t [dB] | Bending loss ratio |
| 1 | 0.024 | 0.015 | — | 0.152 | 0.071 | — | 6.327 | 1.988 | — |
| 2 | 0.008 | 0.005 | 0.00 | 0.035 | 0.017 | 0.23 | 0.892 | 0.280 | 0.14 |
| 3 | 0.008 | 0.005 | 0.33 | 0.035 | 0.017 | 0.23 | 0.829 | 0.260 | 0.13 |
| 4 | 0.005 | 0.003 | 0.00 | 0.020 | 0.009 | 0.13 | 0.421 | 0.132 | 0.07 |
| 5 | 0.095 | 0.060 | — | 0.502 | 0.316 | — | 16.60 | 5.215 | — |
| 6 | 0.023 | 0.011 | 0.18 | 0.084 | 0.040 | 0.13 | 1.522 | 0.478 | 0.09 |
| 7 | 0.027 | 0.013 | 0.21 | 0.095 | 0.045 | 0.14 | 1.709 | 0.537 | 0.10 |
| 8 | 0.016 | 0.008 | 0.13 | 0.054 | 0.025 | 0.08 | 0.839 | 0.264 | 0.05 |
| 9 | 0.159 | 0.075 | 1.26 | 0.772 | 0.364 | 1.15 | 22.47 | 7.059 | 1.35 |
| 10 | 0.018 | 0.008 | 0.14 | 0.057 | 0.027 | 0.09 | 0.871 | 0.274 | 0.05 |
| 11 | 0.010 | 0.005 | 0.08 | 0.031 | 0.015 | 0.05 | 0.450 | 0.141 | 0.03 |
| 12 | 0.863 | 0.542 | — | 3.522 | 1.660 | — | 83.83 | 26.34 | — |
| 13 | 0.281 | 0.176 | 0.33 | 0.781 | 0.368 | 0.22 | 10.23 | 3.214 | 0.12 |
| 14 | 0.325 | 0.204 | 0.38 | 0.854 | 0.403 | 0.24 | 10.31 | 3.238 | 0.12 |
| 15 | 0.080 | 0.050 | 0.09 | 0.183 | 0.086 | 0.05 | 1.762 | 0.553 | 0.02 |
| 16 | 0.007 | 0.004 | — | 0.011 | 0.005 | — | 0.052 | 0.016 | — |
| 17 | 0.094 | 0.059 | 0.11 | 0.203 | 0.096 | 0.06 | 1.781 | 0.560 | 0.02 |
| 18 | 0.009 | 0.006 | — | 0.013 | 0.006 | — | 0.063 | 0.020 | — |
| 19 | 0.083 | 0.052 | 0.10 | 0.194 | 0.091 | 0.06 | 1.915 | 0.602 | 0.02 |

TABLE 4-continued

| | Bending loss at 1650 nm | | | | | | | | |
|---|---|---|---|---|---|---|---|---|---|
| | 20 φ | | | 15 φ | | | 10 φ | | |
| Sample No. | [dB/m] | ×10 t [dB] | Bending loss ratio | [dB/m] | ×10 t [dB] | Bending loss ratio | [dB/m] | ×10 t [dB] | Bending loss ratio |
| 20 | 0.098 | 0.061 | 0.11 | 0.216 | 0.102 | 0.06 | 1.972 | 0.619 | 0.02 |
| 21 | 3.724 | 2.340 | — | 11.26 | 5.305 | — | 176 | 55.16 | — |
| 22 | 0.958 | 0.602 | 0.26 | 1.956 | 0.922 | 0.17 | 16.78 | 5.272 | 0.10 |
| 23 | 0.500 | 0.314 | 0.13 | 0.923 | 0.435 | 0.08 | 6.726 | 2.113 | 0.04 |
| 24 | 0.022 | 0.014 | — | 0.024 | 0.011 | — | 0.073 | 0.023 | — |
| 25 | 0.024 | 0.015 | — | 0.025 | 0.012 | — | 0.073 | 0.023 | — |
| 26 | 0.010 | 0.006 | — | 0.009 | 0.004 | — | 0.024 | 0.007 | — |
| 27 | 0.011 | 0.007 | — | 0.010 | 0.005 | — | 0.024 | 0.008 | — |
| 28 | 36.35 | 22.84 | — | 81.39 | 38.36 | — | 860 | 270 | — |
| 29 | 5.060 | 3.179 | 0.14 | 7.001 | 3.299 | 0.09 | 35.28 | 11.08 | 0.04 |
| 30 | 1.873 | 1.777 | 0.05 | 2.269 | 1.069 | 0.03 | 9.220 | 2.897 | 0.01 |
| 31 | 1.026 | 0.645 | 0.03 | 1.019 | 0.480 | 0.01 | 3.016 | 0.948 | 0.00 |
| 32 | 0.050 | 0.031 | — | 0.032 | 0.015 | — | 0.046 | 0.014 | — |
| 33 | 11.20 | 7.037 | 0.31 | 18.19 | 8.571 | 0.22 | 118.4 | 37.21 | 0.14 |
| 34 | 11.05 | 6.943 | 0.30 | 17.29 | 8.146 | 0.21 | 106.2 | 33.35 | 0.12 |
| 35 | 68.87 | 43.27 | — | 146.9 | 69.20 | — | MNP | MNP | — |
| 36 | 16.82 | 10.57 | 0.24 | 23.44 | 11.04 | 0.16 | 122.5 | 38.48 | — |
| 37 | 7.585 | 4.766 | 0.11 | 9.229 | 4.349 | 0.06 | 38.767 | 12.18 | — |
| 38 | 265.4 | 166.8 | — | 466.4 | 219.8 | — | MNP | MNP | — |
| 39 | 38.48 | 24.18 | 0.14 | 40.92 | 19.28 | 0.09 | 146.3 | 45.95 | — |
| 40 | 37.85 | 23.78 | 0.14 | 41.10 | 19.37 | 0.09 | 151.9 | 47.71 | — |

The results in Tables 1 to 4 indicate that it is possible to reduce the bending loss by providing the low refractive index layer. The effect of reducing the bending loss becomes more evident by comparing the bending losses of fibers having a low refractive index layer with those of fibers without a low refractive index layer. For example, when looking at the bending losses at 1550 nm with 20 mm φ, the bending losses of Sample. Nos. 21, 28, 35, and 38 without a low refractive index layer exceeded 0.5 dB per 10 turns. In particular, in Sample Nos. 35 and 38, bending losses of over 10 dB were generated. However, each of Sample Nos. 22, 23, 29 to 34, 36, 37, 39, and 40 exhibited a bending loss ratio of 0.4 or less. Sample Nos. 22, 23, 30, and 31 exhibited bending losses below 0.5 dB per 10 turns. As Sample Nos. 1, 5, 9, and 12 indicate, it is possible to design a fiber without a low refractive index layer that achieves a bending loss of 0.5 dB or lower per 10 turns with 20 mm φ. However, the MFDs of these structures without a low refractive index layer were below 7.5 μm at 1310 nm, and they were undesirable in that their splice loss with a SMF was inferior to the design of the present invention having a low refractive index layer. In addition, while Sample Nos. 29, 33, 34, 36, and 37 had a bending loss over 1 dB per 10 turns with 20 mm φ, reduction in the loss of 5 dB or higher was achieved for Nos. 28 and 35, which were taken as the standards, achieving low bending loss of several decibels. These samples had an effect of significantly suppressing the loss due to bending, in addition to exhibiting MFDs, cut-off wavelengths, and zero dispersion wavelengths that were compliant with the single-mode optical fiber stipulated in ITU-T G.652. They had an effect of suppressing an increase in the loss due to bending when laying cable for conventional lines.

In contrast, although Sample Nos. 16, 18, 24 to 27, and 32 having a refractive index volume V of 110%·μm$^2$ or higher exhibited very low bending losses, their cut-off wavelength became very long, which made achieving single-mode transmission at 1260 nm or shorter difficult, which is the aim of the present invention.

With such optical fibers to which a low refractive index layer is added, it is possible to design fibers that practically incur no increase in loss while maintaining an MFD at a smaller diameter of 15 mm φ. For example, bending losses of Sample Nos. 13 to 15, 17, 19, and 20 per 10 turns with 15 mm φ were 0.1 dB or lower at 1550 nm and MFDs at 1310 nm were about 7.3 μm. Even with a single-peak type without a low refractive index layer, it is possible to reduce the bending loss per 10 turns with 15 mm φ to 0.1 dB or lower at 1550 nm by using the structure of Sample Nos. 1, 5, and 9. However, the MFDs at 1310 nm were values smaller than 6.9 μm, and it can be seen that the connection characteristic with an SMF is inferior to the fibers having the structure of the present invention that exhibit comparative bending characteristics.

Even with Sample Nos. 1, 5, and 9, which provided very low bending losses with 15 mm φ, some degree of bending loss was generated with 10 mm φ (abbreviated as 10φ as appropriate). It is possible to reduce the bending loss with a very small bending diameter of 10 mm φ by using the structure to which a low refractive index layer is added. For example, Sample Nos. 2 to 4, and 6 to 8 exhibited a bending loss ratio with 10 mm φ of 0.13 or lower at 1550 nm while each exhibiting MFDs comparative to those of Sample Nos. 1 and 5. In addition, with Sample Nos. 10 and 11, even lower bending losses were obtained compared to Sample Nos. 6 to 8, which had comparative MFDs at 1310 nm. It is believed that this was achieved by setting the relative refractive index difference of $\Delta_2$ to a small negative value.

Example 1

Figure 4:
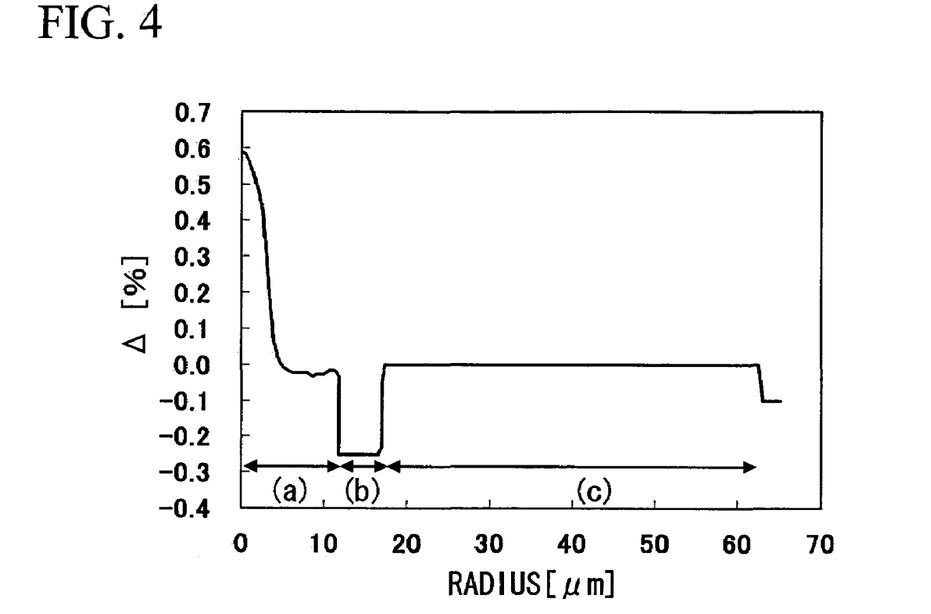
FIG. 4 is a graph showing a refractive index profile of an example of an exemplary embodiment of the present invention.

The refractive index profile of the optical fiber in this example is shown in FIG. 4.

The optical fiber of this example was manufactured by forming the region labeled as (a) in the figure using the VAD method. Then, after the thus obtained core material using the VAD method was drawn, it was subjected to an outside deposition to form the region (b). After the resulting preform was further drawn, it was subjected to an outside deposition to form the region (c). Upon the formation of the region (b), $SiF_4$ gas was introduced during the process of vitrification, thereby obtaining a refractive index lower than that of silica by addition of F. FIG. 4 is the result of the measurement of the refractive index profiles of the preform obtained by the above-described process using a preform analyzer (brand name: MODEL 2600, manufactured by Kinetics Inc./York Technology Ltd.). As can be seen from this figure, although the refractive index profile of the optical fiber of this example does not have a perfect step-shaped shape, it can achieve advantageous effects of the present invention.

Each parameter of the optical fiber of this example was as follows:

The radius $a_1$ of the core 1: 3.09 μm

The radius $a_2$ of the first cladding layer 2: 11.83 μm

The radius $a_3$ of the second cladding layer 3: 16.95 μm

The ratio $a_2/a_1$ of the radius of the first cladding layer 2 to the radius of the core 1: 3.83

The outer diameter of the optical fiber: 125 μm

The refractive index volume (V) of the second cladding layer 3: 36.8%·μm$^2$ When the results were step converted with the above-described core radius $a_1$, the relative refractive index difference $\Delta_1$ of the core 1 was 0.50%, the relative refractive index difference $\Delta_2$ of the first cladding was −0.03%, and the relative refractive index difference $\Delta_3$ of the second cladding was −0.25%.

A transmission loss, a cut-off wavelength, an MFD, a chromatic dispersion, a dispersion slope, a zero dispersion wavelength, and a bending loss at a wavelength of 1550 nm were measured for the optical fiber of this example. The results are shown in Table 5. In addition, a splice loss when fusion spliced with a single-mode optical fiber for the conventional 1.3 μm band that is stipulated in G.652 by ITU-T was measured to obtain 0.18 dB at 1550 nm, which was an allowable level.

It should be noted that the value of a cut-off wavelength in the following Test Examples and Examples was measured using the procedure stipulated in ITU-T G.650.1—Definitions and test methods for linear, deterministic attributes of single-mode fiber and cable for a 2-m optical fiber.

Comparative Example 1

An optical fiber having a single-peak profile in which the second cladding layer 3 was omitted from the refractive index profile of the optical fiber of the above-described Example 1 was fabricated.

More specifically, an optical fiber preform was manufactured by performing the outside deposition of the region (c) to the core preform that had only the region (a) used in the above-described Example 1 and omitting the outside deposition of the region (b). At this time, the thickness of the region (c) was adjusted so that a cut-off wavelength comparative to that of Example 1 was obtained.

Respective optical characteristics were measured for the resultant optical fiber in the manner similar to the above-described Example 1. The results are shown in Table 5 together with the above example.

TABLE 5

| Item | Unit | Measurement wavelength | Example 1 | Comparative Example 1 |
|---|---|---|---|---|
| Transmission loss | [dB/km] | 1550 nm | 0.208 | 0.205 |
| Cut-off wavelength | [μm] | — | 1.20 | 1.20 |
| MFD | [μm] | 1310 nm | 7.37 | 7.35 |
|  |  | 1550 nm | 8.54 | 8.51 |
| Chromatic Dispersion | [ps/nm/km] | 1550 nm | 11.43 | 14.50 |
| Dispersion slope | [ps/nm$^2$/km] | 1550 nm | 0.060 | 0.060 |
| Zero-dispersion wavelength | [nm] | — | 1381 | 1342 |
| Bending loss 20 φ × 10 t | [dB] | 1550 nm | 0.08 | 0.15 |
|  |  | 1650 nm | 0.38 | 2.33 |
| 15 φ × 10 t | [dB] | 1550 nm | 0.34 | 0.64 |
|  |  | 1650 nm | 1.11 | 6.22 |
| 10 φ × 10 t | [dB] | 1550 nm | 1.40 | 10.2 |
|  |  | 1650 nm | 3.90 | 62.0 |

Example 2

Figure 5:
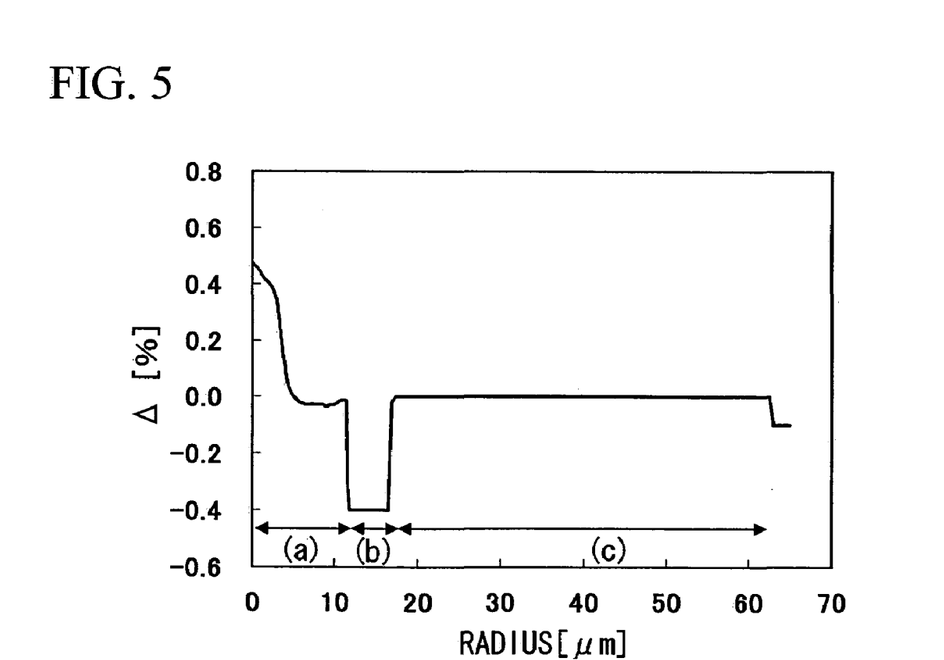
FIG. 5 is a graph showing a refractive index profile of another example of an exemplary embodiment of the present invention.

The refractive index profile of the optical fiber in this example is shown in FIG. 5. The optical fiber of this example was manufactured following the same procedure as that of the above-described Example 1. FIG. 5 shows the result of the refractive index profile of the preform measured using the preform analyzer. As can be seen from this figure, although the refractive index profile of the optical fiber of this example does not have a perfect step-shaped shape, it can achieve advantageous effects of the present invention.

Each parameter of the optical fiber of this example was as follows:

The radius $a_1$ of the core 1: 3.40 μm

The radius $a_2$ of the first cladding layer 2: 11.48 μm

The radius $a_3$ of the second cladding layer 3: 16.45 μm

The ratio $a_2/a_1$ of the radius of the first cladding layer 2 to the radius of the core 1: 3.37

The outer diameter of the optical fiber: 125 μm

The refractive index volume (V) of the second cladding layer 3: 55.8%·μm$^2$ When the results were step converted with the above-described core radius $a_1$, the relative refractive index difference $\Delta_1$ of the core 1 was 0.40%, the relative refractive index difference $\Delta_2$ of the first cladding was −0.02%, and the relative refractive index difference $\Delta_3$ of the second cladding was −0.4%.

A transmission loss, a cut-off wavelength, an MFD, a chromatic dispersion, a dispersion slope, a zero dispersion wavelength, and a bending loss at a wavelength of 1550 nm were measured for the optical fiber of this example in the manner similar to Example 1 described above. The results are shown in Table 6. In addition, a splice loss was measured in the manner similar to Example 1 to obtain 0.05 dB at 1550 nm, which was an allowable level.

Comparative Example 2

An optical fiber having a single-peak profile in which the second cladding layer 3 was omitted from the refractive index profile of the optical fiber of the above-described Example 2 was fabricated.

More specifically, an optical fiber preform was manufactured by performing the outside deposition of the region (c)

to the core preform that had only the region (a) used in the above-described Example 1 and omitting the outside deposition of the region (b). At this time, the thickness of the region (c) was adjusted so that a cut-off wavelength comparative to that of Example 2 was obtained.

Respective optical characteristics were measured for the resultant optical fiber in the manner similar to the above-described Example 2. The results are shown in Table 6 together with the above example.

TABLE 6

| Item | Unit | Measurement wavelength | Example 2 | Comparative Example 2 |
|---|---|---|---|---|
| Transmission loss | [dB/km] | 1550 nm | 0.215 | 0.212 |
| Cut-off wavelength | [µm] | — | 1.22 | 1.22 |
| MFD | [µm] | 1310 nm | 8.27 | 8.42 |
| | | 1550 nm | 9.49 | 9.50 |
| Chromatic Dispersion | [ps/nm/km] | 1550 nm | 14.03 | 15.92 |
| Dispersion slope | [ps/nm²/km] | 1550 nm | 0.064 | 0.060 |
| Zero-dispersion wavelength | [nm] | — | 1351 | 1342 |
| Bending loss 20 φ × 10 t | [dB] | 1550 nm | 0.69 | 2.09 |
| | | 1650 nm | 1.67 | 17.29 |
| 15 φ × 10 t | [dB] | 1550 nm | 1.02 | 5.43 |
| | | 1650 nm | 3.21 | 31.19 |
| 10 φ × 10 t | [dB] | 1550 nm | 2.20 | 41.8 |
| | | 1650 nm | 4.80 | 122 |

Example 3

Figure 6:
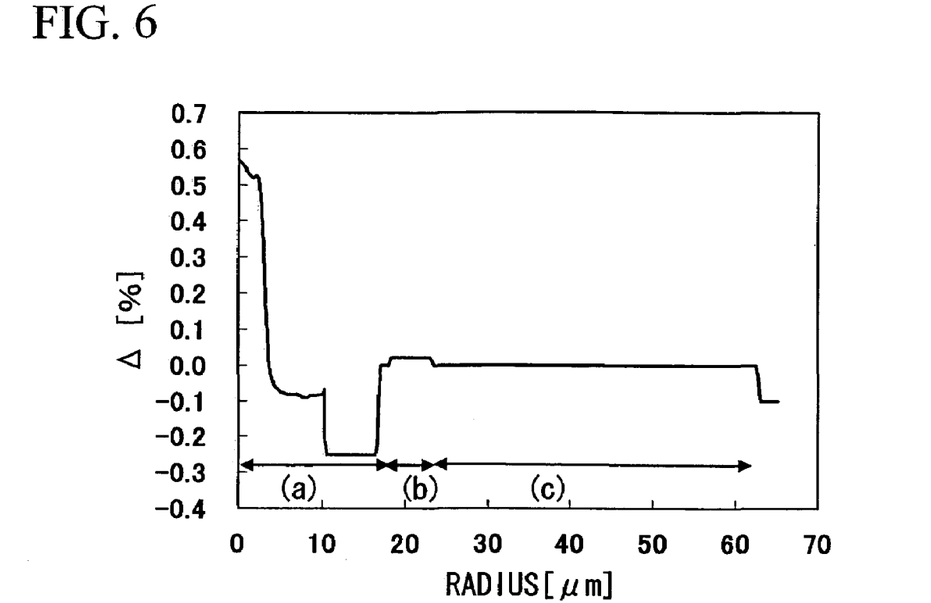
FIG. 6 is a graph showing a refractive index profile of another example of an exemplary embodiment of the present invention.

The refractive index profile of the optical fiber in this example is shown in FIG. 6.

The optical fiber of this example was manufactured by forming the region labeled as (a) in the figure using the MCVD method. In the figure, the region (b) is the starting silica tube used in the CVD method. The core material obtained by the MCVD method was subjected to an outside deposition to form the region (c). FIG. 6 shows the result of the refractive index profile of the preform measured using the preform analyzer. As can be seen from this figure, although the refractive index profile of the optical fiber of this example also does not have a perfect step-shaped shape, it can achieve advantageous effects of the present invention.

Each parameter of the optical fiber of this example was as follows:

The radius $a_1$ of the core 1: 3.12 µm

The radius $a_2$ of the first cladding layer 2: 10.30 µm

The radius $a_2$ of the first cladding layer 2: 16.62 µm

The ratio $a_2/a_1$ of the radius of the first cladding layer 2 to the radius of the core 1: 3.30

The outer diameter of the optical fiber: 125 µm

The refractive index volume (V) of the second cladding layer 3: 42.0%·µm²

When the results were step converted with the above-described core radius $a_1$, the relative refractive index difference $\Delta_1$ of the core 1 was 0.52%, the relative refractive index difference $\Delta_2$ of the first cladding was −0.07%, and the relative refractive index difference $\Delta_3$ of the second cladding was −0.25%.

A transmission loss, a cut-off wavelength, an MFD, a chromatic dispersion, a dispersion slope, a zero dispersion wavelength, and a bending loss at a wavelength of 1550 nm were measured for the optical fiber of this example in the manner similar to Example 1 described above. The results are shown in Table 7.

In addition, a splice loss was measured in the manner similar to Example 1 to obtain 0.29 dB at 1550 nm.

Comparative Example 3

An optical fiber having a single-peak profile in which the second cladding layer 3 was omitted from the refractive index profile of the optical fiber of the above-described Example 3 was fabricated.

In other words, although fluorine-containing gas was used for synthesizing a layer having a low refractive index that was comparative to that of the second cladding in the process of the MCVD method for synthesizing the region (a) in the above-described Example 3, no fluorine-containing gas was used and a layer having a substantially similar refractive index to that of silica was synthesized to prepare a core preform in this comparative example. Next, an optical fiber preform was manufactured by performing an outside deposition of the region (c) to this core preform. At this time, the thickness of the region (c) was adjusted so that a cut-off wavelength comparative to that of Example 3 was obtained.

Respective optical characteristics were measured for the resultant optical fiber in the manner similar to the above-described Example 3. The results are shown in Table 7 together with the above example.

TABLE 7

| Item | Unit | Measurement wavelength | Example 3 | Comparative Example 3 |
|---|---|---|---|---|
| Transmission loss | [dB/km] | 1550 nm | 0.216 | 0.215 |
| Cut-off wavelength | [µm] | — | 1.23 | 1.23 |
| MFD | [µm] | 1310 nm | 7.12 | 7.20 |
| | | 1550 nm | 8.03 | 8.05 |
| Chromatic Dispersion | [ps/nm/km] | 1550 nm | 13.03 | 15.35 |
| Dispersion slope | [ps/nm²/km] | 1550 nm | 0.057 | 0.057 |
| Zero-dispersion wavelength | [nm] | — | 1352 | 1325 |
| Bending loss 20 φ × 10 t | [dB] | 1550 nm | 0.02 | 0.05 |
| | | 1650 nm | 0.15 | 0.33 |
| 15 φ × 10 t | [dB] | 1550 nm | 0.08 | 0.66 |
| | | 1650 nm | 0.34 | 2.79 |
| 10 φ × 10 t | [dB] | 1550 nm | 0.30 | 8.80 |
| | | 1650 nm | 0.96 | 21.5 |

Example 4

Figure 7:
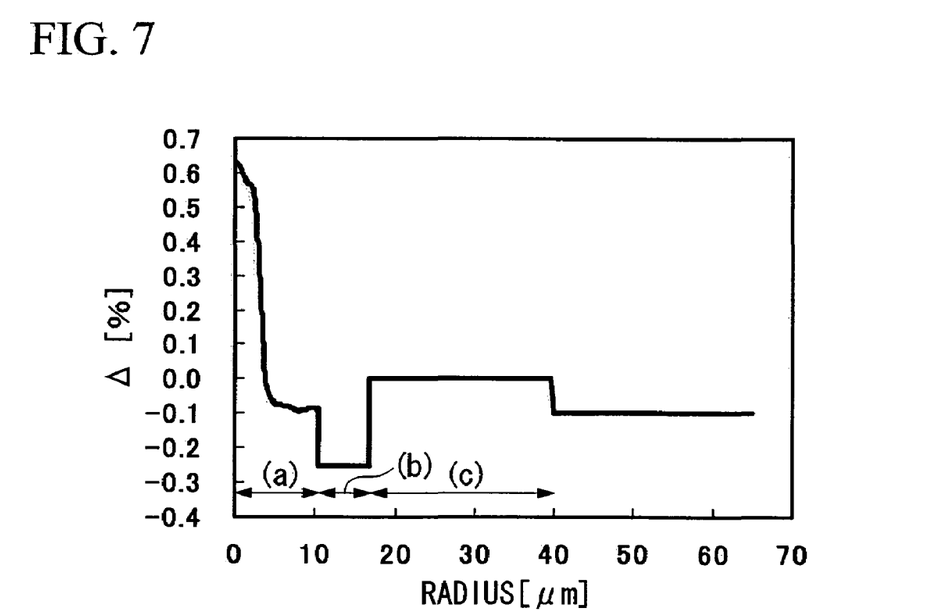
FIG. 7 is a graph showing a refractive index profile of yet another example of an exemplary embodiment of the present invention.

The refractive index profile of the optical fiber in this example is shown in FIG. 7.

The optical fiber of this example was manufactured by forming the region labeled as (a) in the figure using the VAD method. Then, after the thus obtained core material using the VAD method was drawn, it was subjected to an outside deposition to form the region (b). After the resulting preform was further drawn, it was subjected to an outside deposition to form the region (c). Upon the formation of the region (a), a lower refractive index than that of silica was obtained by adding $CF_4$ gas to a burner for synthesizing the inner cladding. Furthermore, upon the formation of the region (b), $SiF_4$ gas was introduced during the process of vitrification, thereby obtaining a refractive index lower than that of silica by addition of F. FIG. 7 shows the result of the refractive index profile of the preform measured using the preform analyzer. As can be seen from this figure, although the refractive index profile of the optical fiber of this example also does not have a perfect step-shaped shape, it can achieve advantageous effects of the present invention.

Each parameter of the optical fiber of this example was as follows:

The radius $a_1$ of the core 1: 3.15 μm

The radius $a_2$ of the first cladding layer 2: 10.37 μm

The radius $a_3$ of the second cladding layer 3: 16.62 μm

The ratio $a_2/a_1$ of the radius of the first cladding layer 2 to the radius of the core 1: 3.30

The outer diameter of the optical fiber: 80 μm

The refractive index volume (V) of the second cladding layer 3: 42.2%·μm²

When the results were step converted with the above-described core radius $a_1$, the relative refractive index difference $\Delta_1$ of the core 1 was 0.56%, the relative refractive index difference $\Delta_2$ of the first cladding was −0.09%, and the relative refractive index difference $\Delta_3$ of the second cladding was −0.25%.

A transmission loss, a cut-off wavelength, an MFD, a chromatic dispersion, a dispersion slope, a zero dispersion wavelength, and a bending loss were measured for the optical fiber of this example in the manner similar to Example 1 described above. The results are shown in Table 8. Measurement wavelengths used for each of the characteristics are listed in the table.

A 2-m fiber cut-off wavelength in this example was 1.30 μm, which was slightly longer than 1.26 μm. When a cable cut-off wavelength was evaluated using a fiber of 22 m long in accordance with ITU-T G.650. 1—Definitions and test methods for linear, deterministic attributes of single-mode fiber and cable, 5.3.4 Alternative test method for the cut-off wavelength (1 cc) of the cabled fiber, it was confirmed that the fiber of this example had a cable cut-off wavelength of 1.23 μm and that this fiber is suitable for practical use.

In addition, a splice loss was measured in the manner similar to Example 1 to obtain 0.4 dB at 1550 nm.

Comparative Example 4

An optical fiber having a structure in which the second cladding layer 3 was omitted from the refractive index profile of the optical fiber of the above-described Example 4 was fabricated.

More specifically, an optical fiber preform was manufactured by performing the outside deposition of the region (c) to the core preform that had only the region (a) used in the above-described Example 4 and omitting the outside deposition of the region (b). In other words, the first cladding layer still had a refractive index lower than that of silica. At this time, the thickness of the region (c) was adjusted so that a cut-off wavelength comparative to that of Example 4 was obtained.

Respective optical characteristics were measured for the resultant optical fiber in the manner similar to the above-described Example 4. The results are shown in Table 8.

TABLE 8

| Item | Unit | Measurement wavelength | Example 4 | Comparative Example 4 |
|---|---|---|---|---|
| Transmission loss | [dB/km] | 1550 nm | 0.205 | 0.204 |
| Cut-off wavelength | [μm] | — | 1.30 | 1.30 |
| Cable-cutoff wavelength | | | 1.23 | 1.24 |
| MFD | [μm] | 1310 nm | 6.90 | 7.02 |
|  |  | 1550 nm | 7.77 | 7.82 |
| Chromatic Dispersion | [ps/nm/km] | 1550 nm | 13.07 | 15.27 |
| Dispersion slope | [ps/nm²/km] | 1550 nm | 0.057 | 0.058 |
| Zero-dispersion wavelength | [nm] | — | 1353 | 1327 |
| Bending loss 20 φ × 10 t | [dB] | 1550 nm | <0.01 | <0.01 |
|  |  | 1650 nm | <0.01 | 0.05 |
| 15 φ × 10 t | [dB] | 1550 nm | 0.06 | 0.07 |
|  |  | 1650 nm | 0.16 | 0.51 |
| 10 φ × 10 t | [dB] | 1550 nm | 0.10 | 1.30 |
|  |  | 1650 nm | 0.74 | 5.9 |

It is contemplated that numerous modifications may be made to the exemplary embodiments of the invention without departing from the spirit and scope of the embodiments of the present invention as defined in the following claims.

The invention claimed is:

1. An optical fiber comprising: a core provided at a center; a first cladding layer provided on a periphery of the core; a second cladding layer provided on a periphery of the first cladding layer; and a third cladding layer provided on a periphery of the second cladding layer, wherein a maximum refractive index of the core is greater than any of maximum refractive indices of the first cladding layer, the second cladding layer, and the third cladding layer, and the maximum refractive index of the second cladding layer is smaller than any of the maximum refractive indices of the first cladding layer and the third cladding layer, a value of $a_2/a_1$ is not less than about 2.5 and not more than about 4.5, where $a_1$ represents a radius of the core, and $a_2$ represents a radius of an outer periphery of the first cladding layer, a relative refractive index difference of the core with respect to a maximum refractive index of the third cladding layer is not less than about 0.20% and not more than about 0.70% and a refractive index volume V of the second cladding layer expressed by Formula (1) is 25% μm² or higher and is 110% μm² or lower, $$V = 2\int_{a_2}^{a_3} |\Delta_n(r)| \cdot r dr \qquad (1)$$

wherein "r" is a radius, $\Delta_n(r)$ is a relative refractive index difference at the radius "r" with respect to a maximum refractive index of the third cladding layer, $a_2$ is a radius of an outer periphery of the first cladding layer, and $a_3$ is a radius of an outer periphery of the second cladding layer.

2. The optical fiber according to claim 1, wherein a cut-off wavelength of said optical fiber is about 1260 nm or shorter.

3. The optical fiber according to claim 1 wherein the refractive index volume V of the second cladding layer is about 50%·µm² or higher.

4. The optical fiber according to claim 1, wherein a relative refractive index difference of the first cladding layer with respect to the maximum refractive index of the third cladding layer is not less than about −0.10% and not more than about 0.05%.

5. The optical fiber according to claim 1, wherein the optical fiber has a bending loss ratio of about 0.4 or less, when assuming an increase in a bending loss at a wavelength of 1550 nm of a single-peak optical fiber that has a single-peak refractive index profile without a second cladding layer and has the same cut-off wavelength when wound ten times around a mandrel having a diameter of 20 mm to be 1, which is a ratio of a value of an increase in bending loss that is measured in the same manner.

6. The optical fiber according to claim 1, wherein the optical fiber has a bending loss ratio of about 0.55 or less, when assuming an increase in a bending loss at a wavelength of 1550 nm of a single-peak optical fiber that has a single-peak refractive index profile without a second cladding layer and has the same cut-off wavelength when wound ten times around a mandrel having a diameter of 15 mm to be 1, which is a ratio of a value of an increase in bending loss that is measured in the same manner.

7. The optical fiber according to claim 1, wherein a value of a bending loss at a wavelength of 1550 nm is about 0.05 dB or lower per turn when wound in a bending diameter of 20 mm, and a mode field diameter at a wavelength of 1550 nm is about 8.3 µm or more.

8. The optical fiber according to claim 7, wherein the value of the bending loss at a wavelength of 1650 nm is about 0.05 dB or lower per turn when wound in a bending diameter of 20 mm.

9. The optical fiber according to claim 7, wherein the value of the bending loss at a wavelength of 1550 nm is about 0.05 dB or lower per turn when wound in a bending diameter of 15 mm, and a mode field diameter at a wavelength of 1310 nm is about 6.8 µm or more.

10. The optical fiber according to claim 9, wherein the value of the bending loss at a wavelength of 1650 nm is about 0.05 dB or lower per turn when wound in a bending diameter of 15 mm.

11. The optical fiber according to claim 7, wherein the value of the bending loss at a wavelength of 1550 nm is about 0.05 dB or lower per turn when wound in a bending diameter of 15 mm and a mode field diameter at a wavelength of 1550 nm is about 7.8 µm or more.

12. The optical fiber according to claim 1, wherein the optical fiber has a mode field diameter value ratio of about 0.98 or higher, when assuming a mode field diameter at a wavelength of 1550 nm of a single-peak optical fiber that has a single-peak refractive index profile without a second cladding layer and has the same cut-off wavelength to be 1, which is a ratio of a value of an increase in mode field diameter that is measured in the same manner.

13. The optical fiber according to claim 7, wherein the value of a bending loss at a wavelength of 1550 nm is about 0.05 dB or lower per turn when wound in a bending diameter of 20 mm and a mode field diameter at a wavelength of 1310 nm is about 7.3 µm or more.

14. The optical fiber according to claim 9, wherein the value of the bending loss at a wavelength of 1550 nm is about 0.05 dB or lower per turn when wound in a bending diameter of 10 mm and a mode filed diameter at a wavelength of 1310 nm is about 6.3 µm or more.

15. The optical fiber according to claim 14, wherein the value of the bending loss at a wavelength of 1650 nm is about 0.05 dB or lower per turn when wound in a bending diameter of 10 mm.

16. The optical fiber according to claim 14, wherein a mode field diameter at a wavelength of 1550 nm is about 7.3 µm or more.

17. The optical fiber according to claim 1, wherein a mode field diameter is about 7.9 µm or more at a wavelength of 1310 nm, and a value of a bending loss at a wavelength of 1550 nm when wound in a bending diameter of 20 mm is about 1 dB or lower per turn, and a zero dispersion wavelength is not less than about 1300 nm and not more than about 1324 nm.

18. The optical fiber according to claim 17, wherein a value of a bending loss at a wavelength of 1550 nm is about 0.5 dB or lower per turn when wound in a bending diameter of 20 mm.

19. The optical fiber according to claim 1, wherein a relative refractive index difference of the second cladding layer with respect to the maximum refractive index of the third cladding layer is not less than about −0.60% and not more than about −0.20%.

20. The optical fiber according to claim 17, wherein a value of a bending loss at a wavelength of 1650 nm is about 19.37 dB or lower when wound ten times in a bending diameter of 15 mm.

* * * * *